3,228,144
APPARATUS FOR APPLYING FINELY DIVIDED MATERIAL TO PLANTS
George E. Homan, Curwensville, Pa.
Filed Mar. 6, 1963, Ser. No. 263,305
5 Claims. (Cl. 47—1)

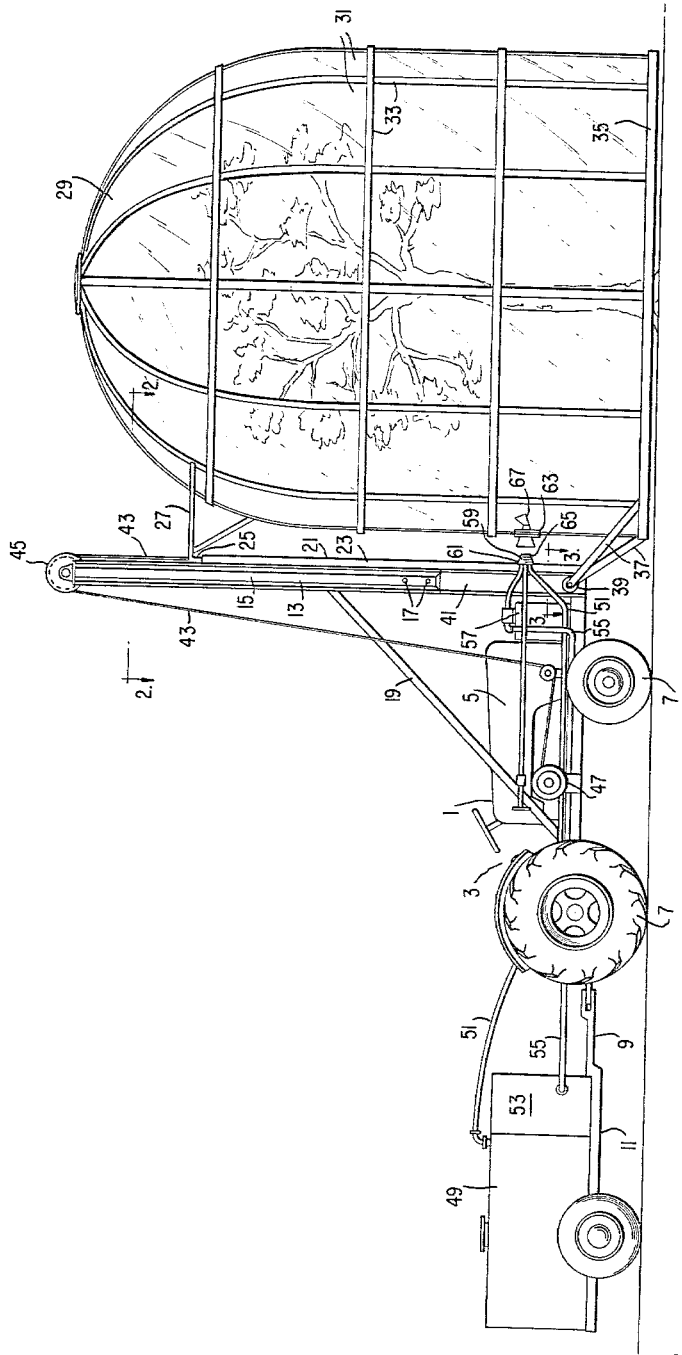

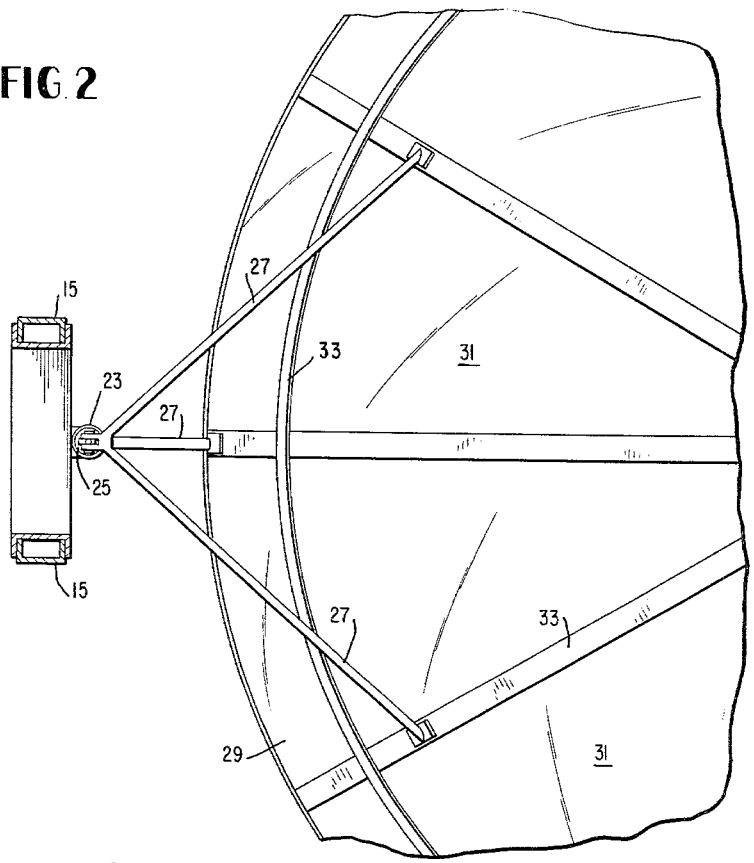
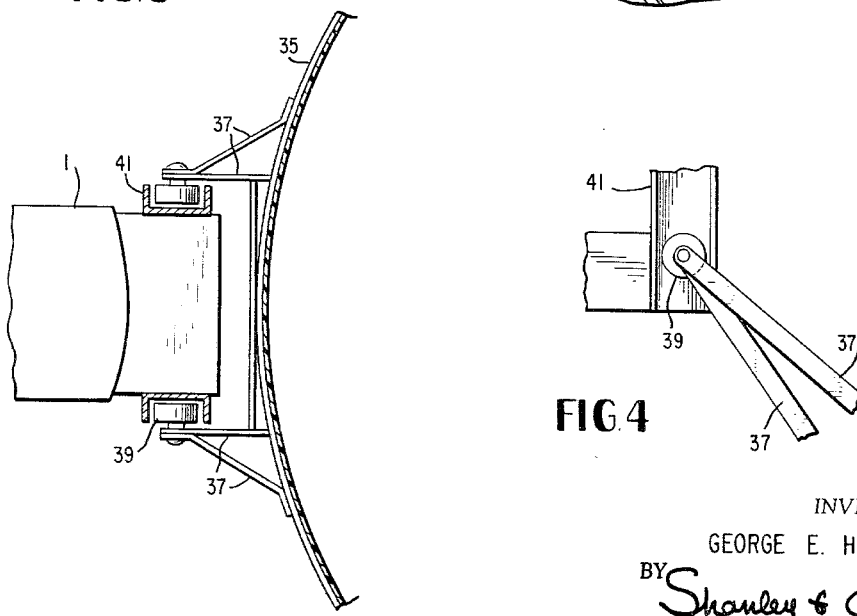

The present invention relates to apparatus for applying finely divided material to plants, more particularly to such devices that spray liquid or project dust beneath a cover that is over the plant.

It is an object of the present invention to provide apparatus for applying finely divided material to plants, which is suitable either for spraying a liquid or for aplying a finely divided solid powder.

Another object of the present invention is the provision of such apparatus having a covering that can be quickly and easily placed over or removed from the plant.

Still another object of the present invention is the provision of such device having a cover which permits the operator to see the plant during treatment.

Finally, it is an object of the present invention to provide such apparatus that will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGURE 1 is a side elevational view of apparatus according to the present invention in use in the application of finely divided material to a tree;

FIGURE 2 is a section taken on the line 2—2 of FIGURE 1;

FIGURE 3 is a section taken on the line 3—3 of FIGURE 1; and

FIGURE 4 is a side elevational view of the structure of FIGURE 3.

Referring now to the drawings in greater detail, there is shown apparatus according to the present invention comprising a vehicle 1 which may for example be a tractor. Vehicle 1 has an operator's station 3 that faces in the direction of the plant to be treated. An engine 5 carried by vehicle 1 drives at least the rear of the wheels 7 of vehicle 1. Vehicle 1 has a hitch 9 at its rear by which it pulls wheeled trailer 11 behind it.

At its forward end, vehicle 1 carries a vertical column 13 comprised of a pair of telescopic sections 15 releasably secured together by bolts 17 passing through sections 15 at vertically spaced points therealong. The loosening and tightening of bolts 17 permits telescoping sections 15 to be adjusted longitudinally relative to each other thereby selectively to alter the height of column 13. A plurality of braces 19 extend diagonally between vehicle 1 a substantial horizontal distance from the base of column 13 and column 13 at a substantial height above the base of the column.

A telescoping assembly 21 is also mounted on vehicle 1 and preferably is secured along its length to column 13 for support and reinforcement. Telescoping assembly 21 comprises a vertical outer tubular member 23 in which is slidably disposed a vertical inner member 25 so that inner member may slide vertically in and relative to outer member 23. Inner member 25 at its upper end carries a plurality of bracket arms 27 that diverge from the upper end of inner member 25.

The ends of bracket arms 27 opposite the upper end of inner member 25 are secured at spaced points to downwardly open cover 29. Cover 29 is generally rigid at least as to its framework. Cover 29 is also largely transparent. It may be comprised of a single member formed of rigid, transparent plastic, but preferably it is comprised of a plurality of sections 31 of clear plastic, for ease of manufacture and repair. Sections 31 are connected along their edges by joint strips 33 which may for example be of aluminum having screws passing through joint strips 33 and through the underlying edges of sections 31. Cover 29 is characterized by a rigid lower rim 35 to which are secured a plurality of spaced bracket arms 37. Bracket arms 37 converge upwardly and carry at their upper end adjacent vehicle 1 a pair of opposed coaxial rollers 39 that are disposed on opposite sides of and ride in a pair of vertical oppositely outwardly opening channels 41 that are secured and supported at their lower ends on vehicle 1.

An elongated filament usch as a flexible cable 43 is reeved over a pulley 45 mounted at the upper end of column 13 for rotation about a horizontal axis. One end of cable 43 is secured to the upper end of inner member 25 of telescoping assembly 21, while the other end of cable 43 is mounted to be wound on the drum of a winch 47 carried by vehicle 1 and driven by engine 5 of the vehicle.

A liquid storage tank 49 for the storage of a liquid to be sprayed on plants is carried on trailer 11. A liquid conduit 51 extends forwardly from tank 49, and an air compressor also carried by trailer 11 is adapted to pressurize tank 49 so as to force liquid through conduit 51. An air conduit 55 also extends forwardly from compressor 53 past a dust container 57 adapted to contain a dust to be blown onto plants. Conventional means at the top of dust container 57 are provided for entraining dust in the current of air that passes through air conduit 55 toward the front of the machine. A liquid discharge nozzle 59 is provided at the front of vehicle 1 directed in a forward direction. A discharge nozzle 61 for finely divided solid material is provided immediately beside it and is disposed immediately behind it in FIGURE 1. Check valves (not shown) are disposed in each of conduits 51 and 55 to prevent backflow through those conduits.

Cover 29 is provided with an opening through one side thereof a substantial distance above rigid lower rim 35. This opening is surrounded by a connection 63 that extends through cover 29. Connection 63 is a rotatable quick connection coupling that connects with complementary screw threads 65 on nozzle 59 and 61 so that when connection 63 is turned in contact with one of nozzles 59 and 61, it will quickly connect so that nozzle 59 or 61 can discharge through the opening surrounded by connection 63. A distributor head 67 within cover 29 communicates with connection 63 to direct liquid or dust sprayed through connection 63 toward the plant to be treated within cover 29.

The liquid or dust to be applied to the plant can, of course, be any of the usual insecticides or fertilizers or the like. The plants, of course, can be trees or bushes or even annual crops, and the produce can be fruit, tobacco, nuts, vegetables, cotton or the like. The invention accordingly is in no way limited by the nature of the material applied or by the nature of the plant to which the material is applied.

Of course, cover 29 can be of any desired shape, depending upon the size of the plant to be treated. Moreover, cover 29 can be raised to any desired height, within reason, by adjusting telescoping sections 15 vertically relative to each other so as to raise or lower pulley 45 to any desired height depending on how high cover 29 has to be raised and lowered in order to clear the plant being treated. In general, of course, cultivated crops and trees in orchards will be about the same size in height, so that the size of cover 29 and the height to which it can be raised will tend to be fairly uniform for a given species of plant.

In operation, the operator drives the vehicle through the orchard or other type of farm, from plant to plant to be treated. He drives the vehicle toward the plant to be treated and stops a short distance from it. The cover has been raised by operation of winch 47, inner member 25 sliding vertically in outer member 23 and rollers 39 rolling vertically in channels 41 so that cover 29 moves straight up and straight down guidedly adjacent its upper and lower portions. The rigidity of lower rim 35 assures that cover 29 will be and remain properly oriented in all vertically adjusted positions.

When cover 29 is directly over the plant to be treated, winch 47 is operated in the opposite direction, at which time cover 29 descends by its own weight over the plant to be treated. Cover 29 can descend all the way to the ground or it can be stopped a predetermined distance above the ground by limit switches or the like (not shown). It is not necessary that lower rim 35 contact the ground, for there is virtually no loss of the applied material even if lower rim 35 does not contact the ground. Therefore, it is possible to operate on irregular terrain without appreciable loss of material to be applied.

In any event, cover 29 is lowered until connection 63 is at about the level of nozzles 59 and 61. The conduits 51 and 55 that supply the respective nozzles 59 and 61 with liquid, or air containing entrained dust, are sufficiently flexible and slack that a selected nozzle 59 or 61 can be moved into engagement with connection 63, whereupon connection 63 is turned until the fluid circuit through the chosen nozzle 59 or 61 is completed. Thereafter, air compressor 53 is actuated and the appropriate valve (not shown) in liquid conduit 51 or air conduit 55 is opened to send liquid or air through the conduit thereby to spray liquid within cover 29 or blow air with entrained dust into cover 29 through the opening that is surrounded by connection 63.

When the application is complete, air compressor 53 is turned off, connection 63 is manipulated to break the connection, cover 29 is raised by operation of winch 47, and the operator drives the vehicle to the next plant to be treated, at which time the operation is repeated, and so on until the entire group of plants has been treated. It should also be noted that at all times during the operation, the weight of cover 29 and its associated structure on the front of the vehicle is at least balanced by the weight of fluid in tank 49 and the weight of air compressor 52 on the trailer 11 at the rear of the vehicle, so that cover 29 does not tend to tip the vehicle forwardly.

From the foregoing description, therefore, it will be appreciated that all of the initially recited objects of the present invention have been achieved. Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. Apparatus for applying finely divided material to plants, comprising a vehicle, a cover for a plant, the cover having a rigid lower portion, means mounting the cover on the vehicle for vertical movement, said means being secured to at least an upper portion of the cover and to said lower portion of the cover, said means including a vertically extensible column mounted on the vehicle, a pair of vertically disposed telescoping members one of which is mounted on the vehicle and the other of which is vertically slidable relative to said one member, rigid bracket means securing said other member to the cover, and means acting between an upper portion of the column and said other member to raise said other member, said means including vertical guideways mounted on the vehicle, and means secured to the rigid lower portion of the cover and mounted for vertical movement in guided relationship with said guideways said last named means comprising rigid bracket arms carrying rollers at the ends thereof, said rollers being mounted in said guideways.

2. The apparatus of claim 1, further comprising means carried by the vehicle for discharging finely divided material beneath the cover, the cover having an opening therethrough and means carried by the cover and associated with the discharging means for detachably securing the discharging means in the opening through the cover, and means for selectively supplying a finely divided solid material or a liquid to said discharging means.

3. The apparatus of claim 2 wherein said means mounting the cover on the vehicle is adjacent the front of the vehicle for vertical movement, and further comprising a trailer drawn by the vehicle adjacent the rear thereof, means carried by the trailer for storing material to be applied to plants, whereby the weight of the trailer helps balance the weight of the cover, and an air compressor carried by the trailer.

4. Apparatus for applying finely divided material to plants, comprising a vehicle, a cover for a plant, the cover having a rigid lower portion, means mounting the cover on the vehicle for vertical movement, said means being secured to at least an upper portion of the cover and to said rigid lower portion of the cover, said means including a vertically extensible column mounted on the vehicle, a pair of vertically disposed telescoping members one of which is mounted on the vehicle and the other of which is vertically slidable relative to said one member, rigid bracket means securing said other member to the cover, means acting between an upper portion of the colum and said other member to raise the other said member, means carried by the vehicle for discharging finely divided material beneath the cover, the cover having an opening therethrough, and means carried by the cover and associated with the discharging means for detachably securing the discharging means in the opening through the cover.

5. The apparatus of claim 4 wherein said means mounting the cover on the vehicle is adjacent the front of the vehicle for vertical movement, further comprising a trailer drawn by the vehicle adjacent the rear thereof, and means carried by the trailer for storing material to be applied to plants, whereby the weight of the trailer helps balance the weight of the cover.

References Cited by the Examiner
UNITED STATES PATENTS

| | | | |
|---|---|---|---|
| 1,382,017 | 6/1921 | Saladiner | 43—148 |
| 1,732,191 | 10/1929 | Evans | 43—126 |
| 1,980,427 | 11/1934 | Parker | 239—172 X |
| 2,590,677 | 3/1952 | Broyhill | 239—167 |
| 2,614,884 | 10/1952 | Essick | 239—168 |
| 2,977,715 | 4/1961 | Lindsay | 47—1.7 |

ABRAHAM G. STONE, *Primary Examiner.*
T. GRAHAM CRAVER, *Examiner.*
L. J. BLACKMAR, R. E. BAGWILL,
*Assistant Examiners.*